Oct. 10, 1967  P. ROBINSON  3,346,789
ELECTRICAL CAPACITOR WITH IMPREGNATED METALLIZED ELECTRODE
Original Filed Aug. 14, 1961
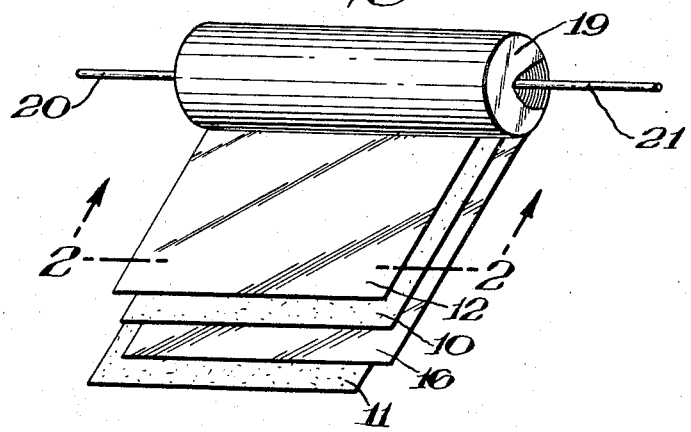
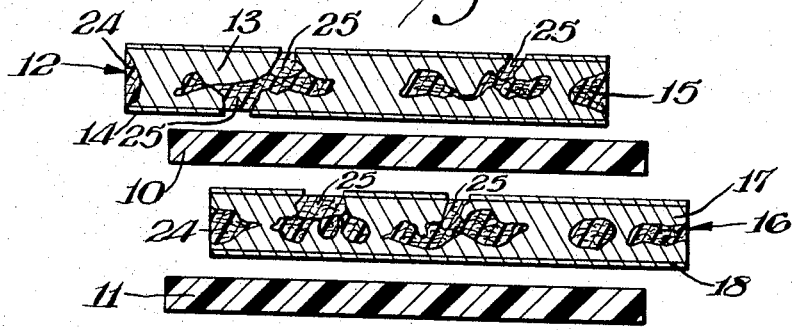

United States Patent Office 3,346,789
Patented Oct. 10, 1967

3,346,789
ELECTRICAL CAPACITOR WITH IMPREGNATED METALLIZED ELECTRODE
Preston Robinson, Williamstown, Mass., assignor to Sprague Electric Company, North Adams, Mass., a corporation of Massachusetts
Continuation of application Ser. No. 131,971, Aug. 14, 1961. This application Oct. 22, 1965, Ser. No. 502,262
4 Claims. (Cl. 317—258)

This application is a continuation of my now abandoned application SN 131,971 filed Aug. 14, 1961, which was a continuation-in-part of now abandoned application SN 542,206 filed Oct. 24, 1955, which in turn was a continuation-in-part of now abandoned application SN 256,453 filed Nov. 15, 1951.

This invention relates to electrical capacitors of the metallized plastic film type, and more particularly to fully impregnated metallized film capacitors.

Metallized paper capacitors are well known to the art and are used where high capacity per unit volume is required. It is also known in the art to impregnate metallized paper capacitors to ensure that all air spaces and voids within the capacitance section are filled with dielectric, thereby avoiding sparking, corona, and the like, which would lead to destruction of the capacitor. Disadvantages of metallized paper capacitors include the inability to dissipate the heat generated under high frequency operation, which results in degradation of the paper upon which the metallized electrode is disposed, thereby reducing the high voltage life of the capacitance section by the failure or breakdown of the paper.

Plastic film dielectric material is known to the capacitor art to have better dielectric properties, particularly power factor, than paper. The desirable properties of these plastic films have resulted in the general substitution of plastic film for paper, including the substitution of plastic film as a base for metallized electrodes. However, it soon became apparent that plastic film capacitors were not capable of being fully impregnated because the smooth non-porous nature of the plastic films prevented retention of the impregnant at the electrode-dielectric interface. These voids at the electrode interface result in failure of the capacitor under voltage because of sparking and corona. A disadvantage of capacitors employing metallized plastic films has been the tendency for the plastic film to soften or otherwise deteriorate under self-healing conditions before the metallized electrode had a chance to vaporize and clear itself.

A compromise construction for high voltage capacitors has been the use of a plastic film dielectric laminated with a paper dielectric, wherein the paper serves as a wick to enhance impregnation. Although this compromise construction has attained commercial success, it suffers from the disadvantage of introducing paper as a dielectric and thereby limiting the operating conditions to which the capacitance section can be subjected.

It is an object of this invention to overcome the foregoing and related disadvantages of the prior art.

It is a further object of this invention to produce a high voltage electrical capacitor that is fully impregnated and capable of operation over extended temperature and frequency ranges.

Still further objects of this invention will become apparent from the following description and claims when considered in conjunction with the accompanying drawing, wherein:

FIGURE 1 is a perspective view of a partially unrolled capacitance section showing the impregnated supporting base and the metallized strata supported on the supporting base according to this invention; and FIGURE 2 is a greatly enlarged schematic sectional view of the successive layers of FIGURE 1 and showing the composite makeup of the layers in the capacitor of this invention.

In general, the objects of this invention are attained by a capacitance section wherein the active dielectric spacing material is a plastic film and full impregnation of the section is attained by utilizing a porous readily impregnatable electrode.

In a more restricted sense, the objects of this invention are attained by a capacitance section wherein the electrodes are porous paper which has been metallized on both faces so as to constitute only a single electrode. The resulting porous electrodes are then separated in the capacitance section by a plastic dielectric film. This capacitance section is capable of full impregnation because the porosity of the electrode holds the impregnant at the electrode-dielectric interface.

The preferred embodiment of this invention is a fully impregnated capacitance section comprising a pair of porous metallized electrodes separated by a plastic film. The resulting capacitor is fully impregnated even though the only impregnatable layers are the metallized electrodes themselves. The porous paper which serves as the base for the metallization is no longer effectively a dielectric, because the metallization extends through many of the pores of the paper. The normal self-healing capabilities of metallized paper capacitors remain in this construction because the thin film of metal is still vaporizable under conditions of shorting in the capacitance section. At the same time the presence of the dielectric impregnant acts as a heat-sink and protects the plastic film in the neighborhood of the self-healing action from the overheating that was suffered by prior art metallized plastic-film capacitors.

The failure of high-voltage capacitance sections employing plastic-film dielectrics with ordinary foil electrodes is primarily due to the action of corona and sparks in the voids that are invariably left by attempts to impregnate the sections. The impregnation of capacitance sections with polymerizable resins also results in the creation of voids because of contraction of the resins on polymerization. The high-voltage failures of plastic-film capacitance sections and capacitance sections which have been impregnated with polymerized resins have greatly reduced the types of capacitance sections which are acceptable for high-voltage applications.

In a preferred embodiment of this invention a capacitance section having porous metallized electrodes separated by a plastic film dielectric is impregnated with a polymerizable resin. Upon polymerization of the resin, the expected void formations occur as in prior art capacitance sections. However, the action of high-voltage sparks and corona in these voids now cause the metallized electrodes to vaporize or melt at the electrical discharge, thereby effectively opening that part of the circuit which includes the void. This vaporization of the metallized electrode differs from the so-called self-healing action of the ordinary metallized-paper capacitor at low voltage which occurs because of the development of heat, upon a direct short between the electrodes, to vaporize or clear metal from the short circuit.

An additional advantage of a capacitance section constructed according to this invention which employs a polymerized resin impregnant is that the capacitance section has no liquid or meltable dielectric and therefore eliminates the problems of leakage which has constantly plagued the metallized capacitor art.

Additional advantages of the preferred construction of this invention result from exceptional resistance to adverse environmental conditions, such as moisture and foreign matter of various sorts. This superior resistance to adverse conditions results from the dielectric being relatively impervious, coupled with the high voltage vaporizing action which occurs to clear metal away from any local contamination appearing against an electrode.

A highly commercial result of this resistance to adverse conditions is the unusual environments in which the capacitance sections of this invention may be employed. The construction of this invention eliminates the need for an intermediary case for capacitance sections employed within a transformer, or capacitance sections employed in potted sub-assemblies. The capacitance sections of this invention provide size advantages over the prior art when fitted in conventional cases because no need exists for the space that the prior art was forced to provide in the cases for the expansion of liquid impregnants.

FIGURE 1 shows a capacitance section constructed according to the preferred embodiment of this invention, wherein dielectric spacing materials 10 and 11 separate porous metallized electrodes 12 and 16. Electrode assembly 12 consists of a porous insulating base upon which are deposited electrode layers 13 and 14. A marginal unmetallized area 15 is left at one end of the composite electrode. The other electrode assembly 16 consists of a porous insulating layer similarly provided with metallized electrode layers 17 and 18 and an unmetallized area opposite area 15.

Terminal connections to the electrode assemblies are secured by spraying or otherwise depositing conductive material 19 against the metallized side edges of the electrode layers. A terminal lead-wire 20 is embedded or otherwise connected to terminal mass 19. In a like manner, electrode assembly 16 is terminated by a lead-wire 22 embedded in a conducting mass 21.

It will be understood that the lamellar electrodes need not be margined but can be fully metallized and non-inductively wound in the so-called "extended-foil" fashion with the edges of one electrode extending beyond the dielectric layers at one end of the capacitance section, and the other electrode extending from the other end of the section. Dielectric impregnant 24 is shown to have filled all the voids present in the porous bases 12 and 16 and any voids occurring at the electrode-dielectric interface.

FIGURE 2 is a greatly enlarged and somewhat diagrammatic showing of the four distinct layers of the capacitor of FIGURE 1. Each of porous electrodes 12 and 16 is metallized on both of its respective surfaces, and the metallization extends through the pores of the material so as to electrically interconnect the metallized surfaces at many points throughout the assemblage. Impregnation of the capacitor with a solid dielectric impregnant 24 results in a substantially void-free structure, because the impregnant is held in the porous electrodes at the electrode-spacer interfaces. Moreover, any voids that do occur upon normal shrinkage of the solid impregnant are tolerated by vaporization of the metal away from the voids as shown at 25, thereby effectively removing the void from consideration in the electrical circuit of the capacitor.

The thickness of the metallized deposits on the porous bases is extremely thin and is in the order of microns. The metallized layer may be deposited by any of the conventional metallizing techniques known to the capacitor art. Included among these known techniques are the condensation of metal vapor upon the insulating base, chemical deposition, and gas decomposition. The metals employed for the electrode layers include zinc, aluminum, silver, tin, lead, and nickel. The relatively low boiling point of zinc makes possible the high speed metallization of the porous bases. Capacitance sections designed for operation at temperatures of 150° C. and higher are preferably provided with metal electrode coatings of aluminum or nickel.

The porous insulating layer employed as a base for the metallized electrodes preferably has a thickness in the order of about 0.1 mil to about 2 mils. Generally, the porous spacer is as thin as practical to withstand handling during the metallization process, so as to enhance the later volatilization of the deposited metal from both sides of the lamellar electrode. The insulating base may be of any dielectric material having the porosity of paper, that is a porosity of about 25% or greater. The preferred material is paper because of the low cost and high porosity. Other suitable materials include reconstituted mica-paper, glass cloth, and asbestos. It is even possible to utilize some of the porous resinuous films, such as porous polytetrafluoroethylene produced in accordance with the Peck et al. U.S. Letters Patent 2,790,999 issued May 7, 1957. The porous polytetrafluoroethylene of the Peck et al. invention is preferably metallized in accordance with Peck U.S. Letters Patent 2,951,774 issued Aug. 2, 1960.

The preferred materials for the dielectric spacer layers are those plastic films which have been well-known in the capacitor art for their high dielectric constants and their low porosity, but which have been unavailable for use in metallized capacitors because of their inability to take impregnation. The preferred dielectric material of this invention is polyethylene terephthalate because of its good electrical properties and its availability in long lengths of uniform thickness. Other suitable plastic film materials include polystyrene, and derivatives thereof; cellulose esters and ethers, including cellulose acetate sorbate; the polyamides; the polyethylenes, including polytetrafluoroethylene; and the polyesters, including 1,4-cyclohexylenebimethylene terephthalate; and the polycarbonates.

The thickness of the dielectric spacer material, whether it be one layer or the total thickness of several layers, is selected in accordance with standard practices in the art, depending upon the voltage and other operating conditions for the capacitance section. Generally, the spacer is of the same thickness as the electrode, e.g., 0.1 to 2 mils.

The preferred dielectric impregnants for this invention are the resins which are capable of being polymerized in situ such as polyvinyl carbazole, and polystyrene. Other suitable impregnants include the thermoset material such as co-polymers of polyvinyl toluene, polybutadiene, and divinyl benzene.

The following examples should be considered to be illustrative only of the invention and in no way limitative of the scope of the invention.

A capacitance section was constructed according to the drawing to consist of ¼ mil polyethylene-terephthalate film as the spacers 10 and 11 separating lamellar electrodes 12 and 16 each composed of ¼ mil kraft paper metallized completely with zinc to an approximate thickness of 4 to 10 microns. This structure was convolutely wound to a nominal capacitance of 0.6 microfarad, measured at 1000 cycles. The capacitance section was noninductively wound with terminals connected to the respective extending electrodes by means of a sprayed mass of conductive material. The capacitance section was impregnated with N-vinyl carbazole which was thereafter polymerized in situ.

Another example of this invention consists of the same general structure set forth in the preceding example with the exception that the porous paper layers were metallized with aluminum and the resulting capacitance section was impregnated with the thermoset impregnant disclosed in the Ross U.S. Letters Patent 2,892,972 issued June 30, 1959, which consists essentially of a co-polymer of vinyl toluene, polybutyldiene and divinylbenzene.

As many widely different embodiments of this invention may be made without departing from the spirit and scope thereof, it is to be understood that this invention is to be limited only by the appended claims.

What is claimed is:

1. A capacitance section having two electrodes separated by distinct non-porous plastic films, at least one of said electrodes being of porous dielectric material which is metallized on both faces with the metallized surfaces being electrically interconnected through the pores of said material, said section being fully impregnated with a solid dielectric resin material, said impregnant being maintained at the electrode-film interface by said at least one electrode.

2. A convolutely wound electrical capacitor comprising two lamellar electrodes separated by distinct non-porous plastic film, each lamellar electrode having metallized strata directly on the faces of a porous paper ribbon interconnected through the pores of said paper, said capacitance section being substantially fully impregnated with a solid dielectric resin material, said impregnant being maintained at the electrode-dielectric interface by said lamellar electrodes.

3. A capacitance section having two electrodes separated by distinct non-porous plastic dielectric films, each of said two electrodes being of porous paper metallized directly on both faces with the metallized surfaces being electrically interconnected through the pores of said paper, said capacitance section being fully impregnated with a solid dielectric resin material maintained at the electrode-dielectric interface by said porous paper.

4. A capacitance section consisting essentially of two porous electrodes separated by distinct non-porous plastic film, said porous electrodes being paper which has been metallized directly on both faces with the metallized surfaces being electrically interconnected through the pores of said paper, said plastic films being polyethylene terephthalate, and said capacitance section being substantially completely impregnated with in situ polymerized polyvinylcarbazole, said impregnant being maintained at the electrode-film interface by said porous electrodes, any impregnation void in said porous electrodes being cleared of the metallization around the void by electrical discharge.

References Cited

UNITED STATES PATENTS 3,148,315   9/1964   Rondeau _____ 317—258

FOREIGN PATENTS 488,274   11/1952   Canada.
1,059,541   11/1953   France.
499,795   1/1939   Great Britain.

LEWIS H. MYERS, Primary Examiner.

E. GOLDBERG, Assistant Examiner.